US012080123B2

(12) United States Patent
Huke et al.

(10) Patent No.: US 12,080,123 B2
(45) Date of Patent: Sep. 3, 2024

(54) METHOD FOR ARTIFICIAL INTELLIGENCE-BASED CHANGES BASED ON DEVIATIONS FROM PREDICTIONS

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 52 days.

(21) Appl. No.: 17/537,777

(22) Filed: Nov. 30, 2021

(65) Prior Publication Data

US 2022/0172560 A1 Jun. 2, 2022

Related U.S. Application Data

(60) Provisional application No. 63/119,119, filed on Nov. 30, 2020.

(51) Int. Cl.
*G07F 17/32* (2006.01)

(52) U.S. Cl.
CPC ...... *G07F 17/3227* (2013.01); *G07F 17/3288* (2013.01)

(58) Field of Classification Search
CPC ......................... G07F 17/3227; G07F 17/3288
See application file for complete search history.

(56) References Cited

U.S. PATENT DOCUMENTS 7,985,134 B2 7/2011 Ellis
8,764,556 B2 7/2014 Corbo
2020/0005593 A1 1/2020 McDowell et al.

FOREIGN PATENT DOCUMENTS

WO 2007118300 A1 10/2007

OTHER PUBLICATIONS

International Search Report and Written Opinion issued on Apr. 14, 2022 in corresponding International Patent Application No. PCT/US2021/061166; 11 pages.

*Primary Examiner* — Kevin Y Kim
(74) *Attorney, Agent, or Firm* — Maier & Maier, PLLC

(57) ABSTRACT

A method of artificial intelligence (A.I.) based changes based on deviations from predictions by calculating the wager odds for an upcoming play by play wager, determining the active users on a wagering network, performing correlations between the active user's historical wager data and the wager odds, determining the selected wager and the amount to be wagered for each user, determining the total amount wagered for each side of the wager, determining if there is targeted action for the wager and if there is not targeted action updating or altering the wager odds to ensure targeted action from the users when the wager odds are made available on the wagering network.

5 Claims, 6 Drawing Sheets

A system for A.I.-Based Changes Based on Deviations from Predictions

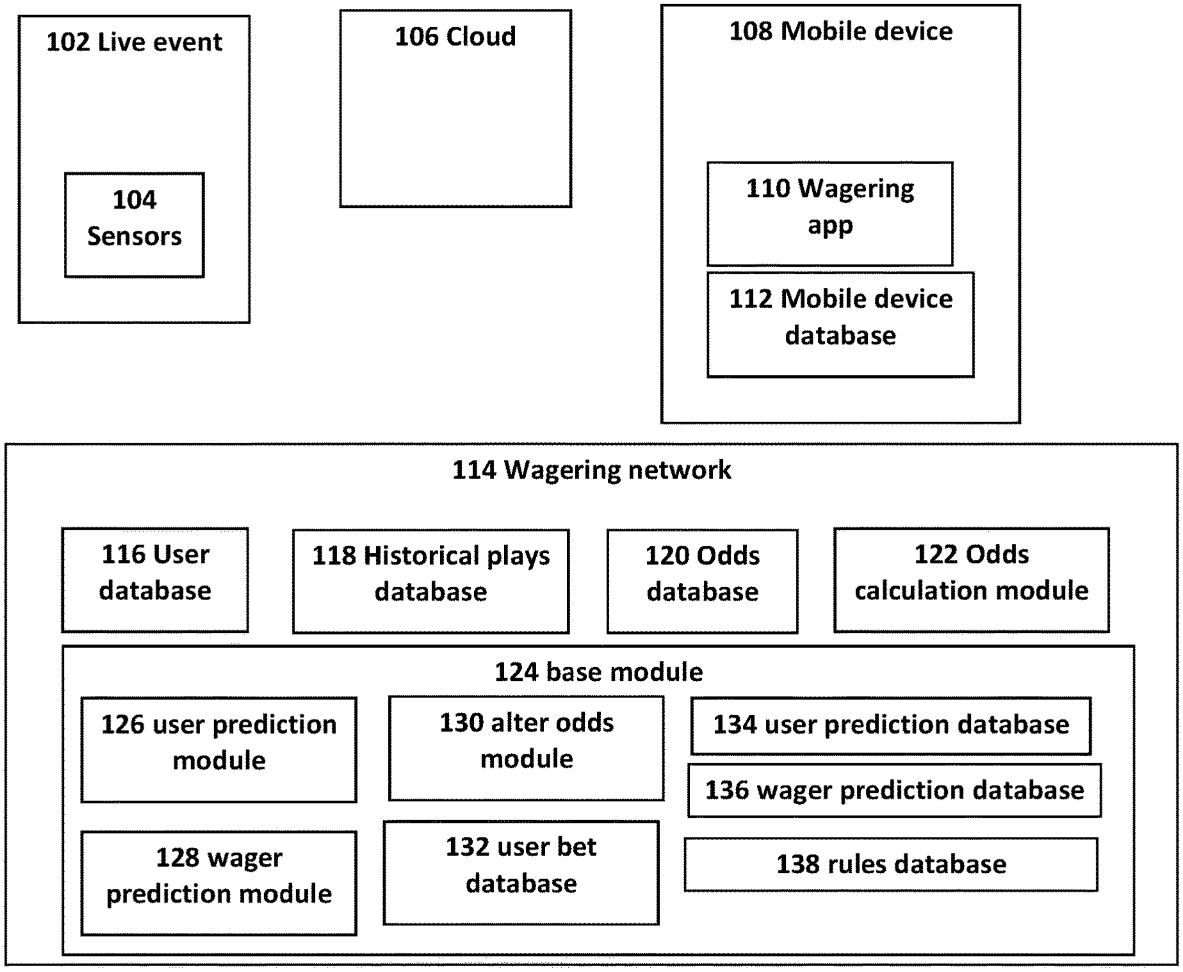
Fig.1 A system for A.I.-Based Changes Based on Deviations from Predictions

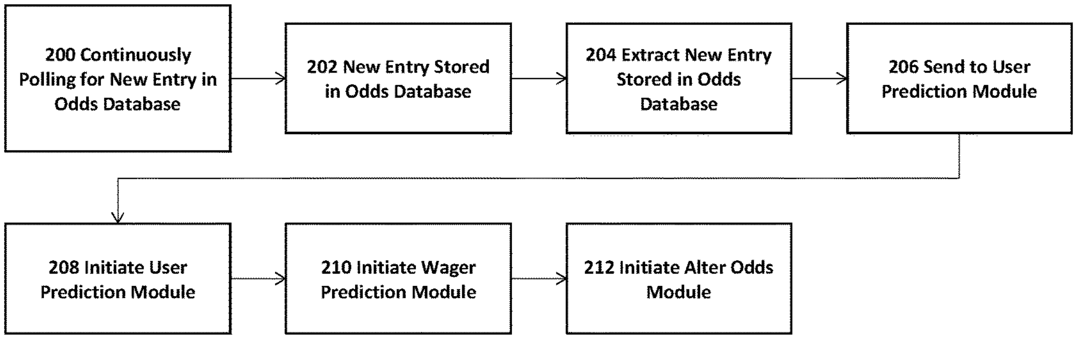
Fig.2 Base Module
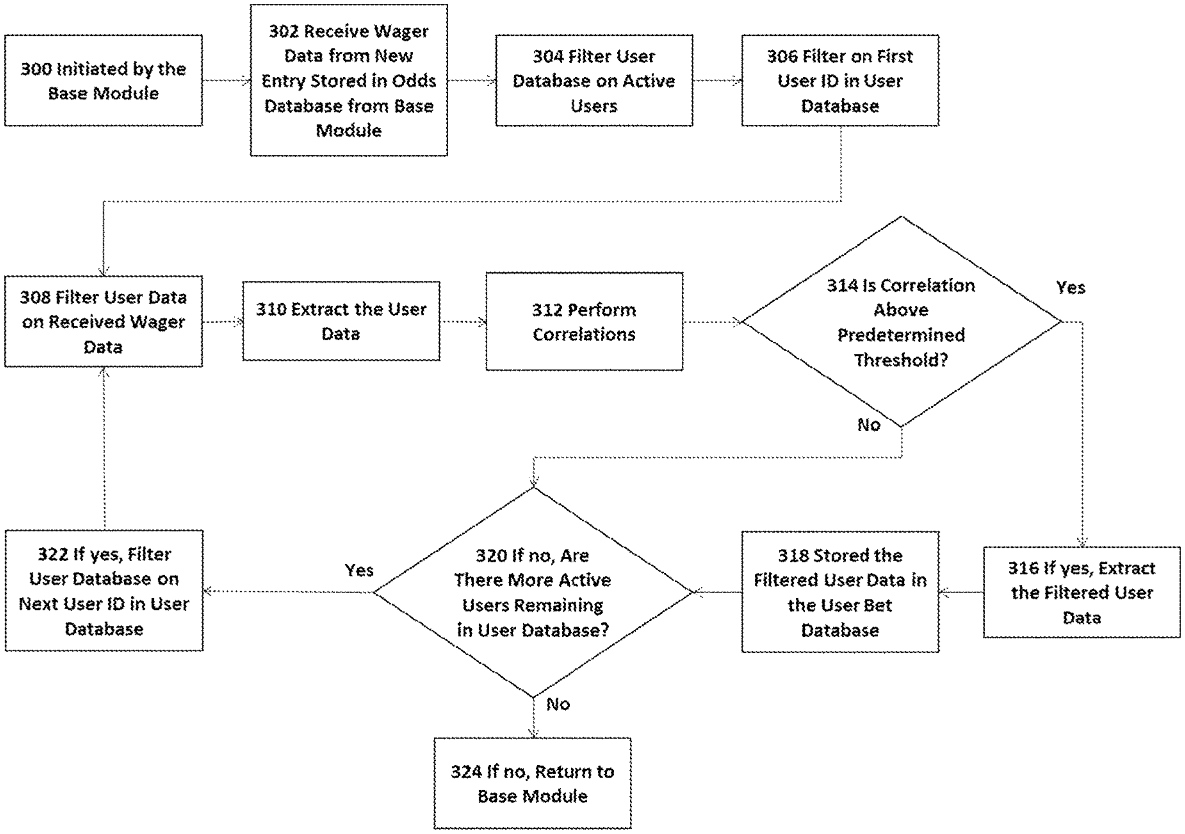
Fig.3 User Prediction Module

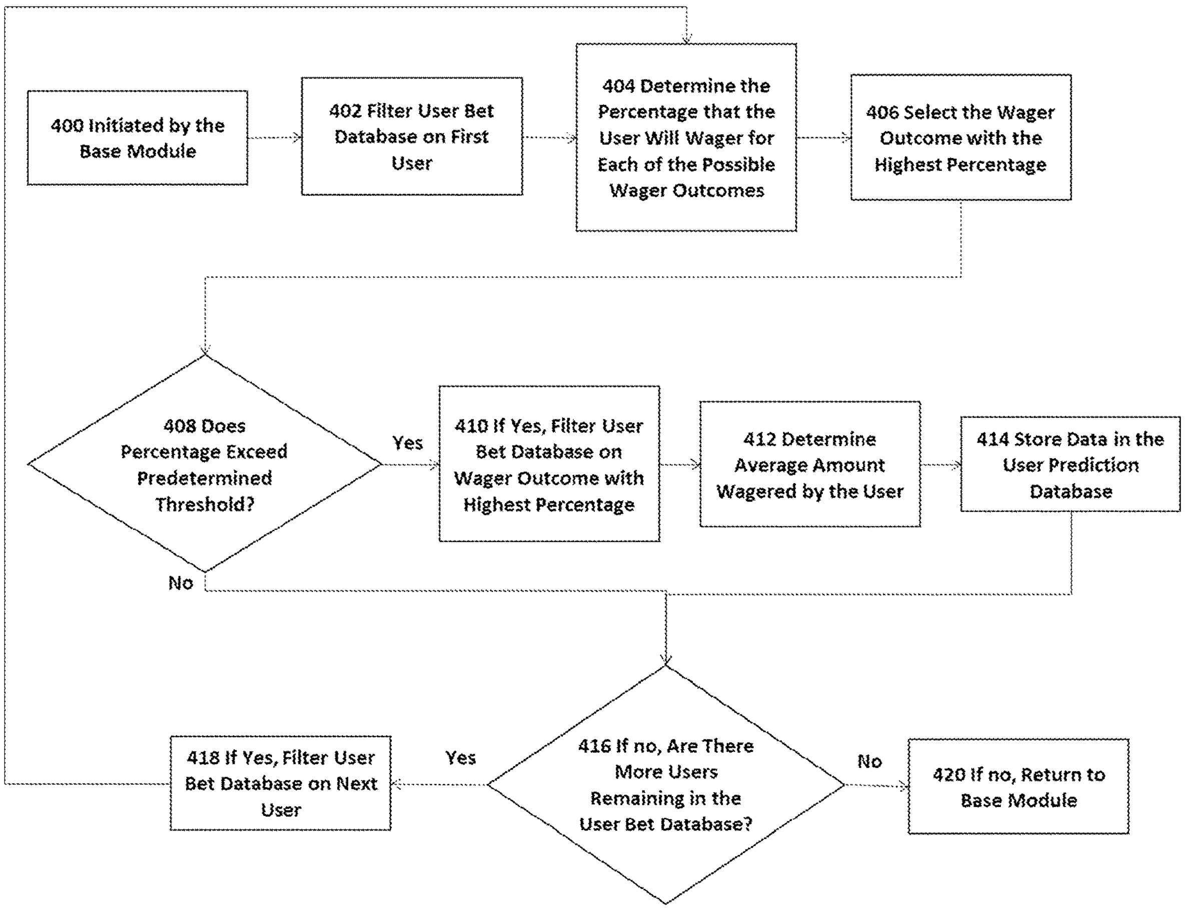
Fig.4 Wager Prediction Module

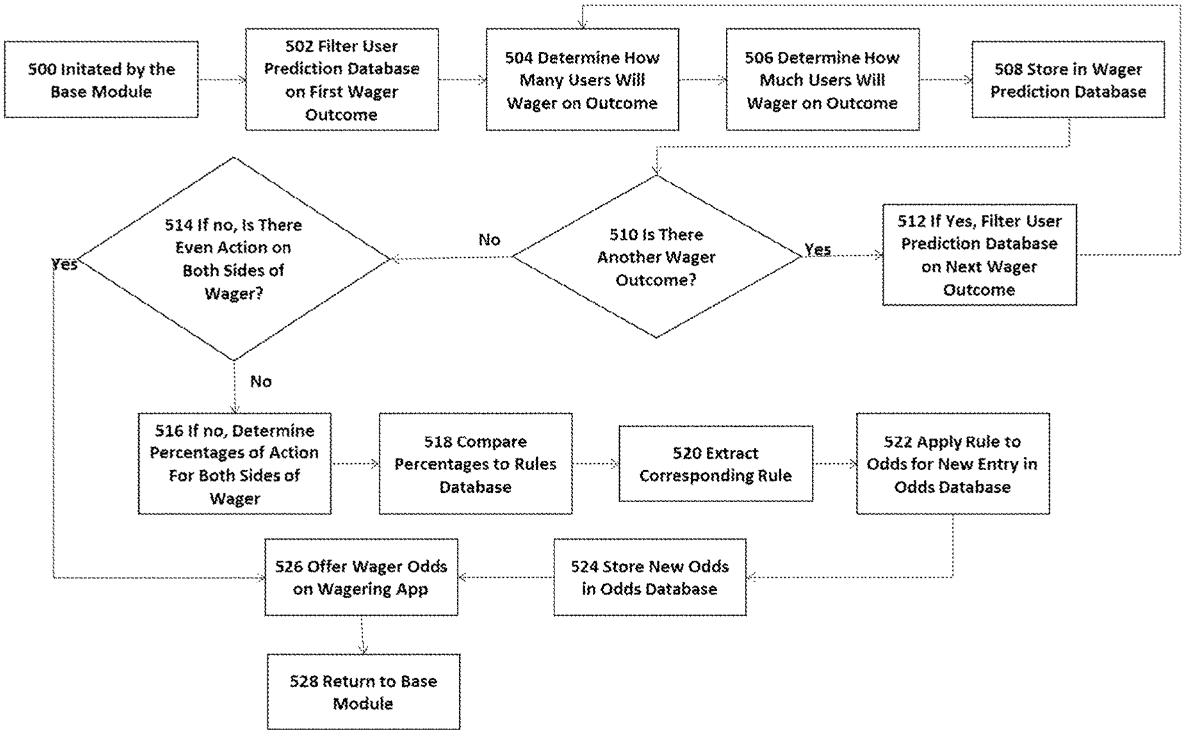
Fig.5 Alter Odds Module

| Wager ID | Event | Wager Market | Outcomes | Odds | User ID | Number of Wager | Total Amount Wagered | Wagered On | Wagerd Amount |
|---|---|---|---|---|---|---|---|---|---|
| 201 | Patriots vs Jets | Result of Play | 1. Pass 2. Run | 1. 2:1 2. 1:2 | JS12345 | 1st | $10 | Pass | $10 |
| 201 | Patriots vs Jets | Result of Play | 1. Pass 2. Run | 1. 2:1 2. 1:2 | JS12345 | 2nd | $20 | Run | $10 |
| 201 | Patriots vs Jets | Result of Play | 1. Pass 2. Run | 1. 2:1 2. 1:2 | JS12345 | 3rd | $30 | Pass | $10 |
| 201 | Patriots vs Jets | Result of Play | 1. Pass 2. Run | 1. 2:1 2. 1:2 | JS12345 | 4th | $40 | Run | $10 |
| 201 | Patriots vs Jets | Result of Play | 1. Pass 2. Run | 1. 2:1 2. 1:2 | JS12345 | 5th | $50 | Pass | $10 |
| - | - | - | - | - | - | - | - | - | - |
| 201 | Patriots vs Jets | Result of Play | 1. Pass 2. Run | 1. 2:1 2. 1:2 | TR98765 | 1st | $5 | Run | $5 |
| 201 | Patriots vs Jets | Result of Play | 1. Pass 2. Run | 1. 2:1 2. 1:2 | TR98765 | 2nd | $10 | Pass | $5 |
| 201 | Patriots vs Jets | Result of Play | 1. Pass 2. Run | 1. 2:1 2. 1:2 | TR98765 | 3rd | $15 | Run | $5 |
| 201 | Patriots vs Jets | Result of Play | 1. Pass 2. Run | 1. 2:1 2. 1:2 | TR98765 | 4th | $20 | Pass | $5 |
| 201 | Patriots vs Jets | Result of Play | 1. Pass 2. Run | 1. 2:1 2. 1:2 | TR98765 | 5th | $25 | Run | $5 |

Fig.6 User Bet Database

| User ID | Wager Result | Average Wager Amount |
|---|---|---|
| JS12345 | Pass | $10 |
| TR98765 | Run | $5 |
| KJ09876 | Pass | $5 |
| LP34567 | Run | $20 |
| HG67543 | Pass | $20 |
| - | - | - |
| - | - | - |
| - | - | - |

Fig.7 User Prediction Database

| Wager Outcome | Number of Users | Amount Wagered |
|---|---|---|
| Pass | 3 | $30 |
| Run | 2 | $20 |
| - | - | - |
| - | - | - |
| - | - | - |

Fig.8 Wager Prediction Database

| Difference in Percentage | Rule |
|---|---|
| Above 1%-10% | Decrease Odds by 10% |
| Under 1%-10% | Increase Odds by 10% |
| Above 11%-20% | Decrease Odds by 20% |
| Under 11%-20% | Increase Odds by 20% |
| - | - |
| - | - |
| - | - |

Fig.9 Rules Database

METHOD FOR ARTIFICIAL INTELLIGENCE-BASED CHANGES BASED ON DEVIATIONS FROM PREDICTIONS

FIELD

The present disclosures are generally related to in-play wagering on live sporting events.

BACKGROUND

There is no easy method to predict how users will wager on possible wager outcomes on wagering platforms and wagering applications.

Also, there is no easy method to predict or forecast how much money will be wagered by the users.

Lastly, there is no way to forecast user behavior and update or alter the wagering odds before the odds being released to the public.

Thus, there is a need within the prior art to provide a method to alter the wager odds based on predictions of how users will react and wager to wager odds.

SUMMARY

Methods, systems, and apparatuses for using machine learning and artificial intelligence to make changes based on deviations from predictions. In one embodiment, a method for artificial intelligence-based changes driven by deviations from predictions on a sport wagering network can include receiving wager data from an odds database; extracting user data from a user database; determining at least one correlation between received wager data and extracted user data by at least one of machine learning, artificial intelligence, or a determination algorithm; determining if the correlation is above a predetermined correlation threshold; determining at least one user wager possibility percentage for at least one possible wager outcome by at least one of machine learning, artificial intelligence, or a determination algorithm; selecting the possible wager outcome with a highest user wager possibility percentage by at least one of machine learning, artificial intelligence, or a determination algorithm; determining if the wager possibility percentage exceeds a predetermined percentage threshold by at least one of machine learning, artificial intelligence, or a determination algorithm; determining at least one average amount wagered and storing the average amount wagered in a user prediction database; determining at least one user who will wager on an outcome and at least an amount to be wagered on the outcome by at least one of machine learning, artificial intelligence, or a determination algorithm; determining if targeted action exists for both sides of a wager and determining an adjustment percentage if targeted action does not exist by at least one of machine learning, artificial intelligence, or a determination algorithm; and offering at least wager odds on a wagering application.

In another embodiment, a system for artificial intelligence-based changes driven by deviations from predictions on a sport wagering network can include a base module; a user prediction module; a wager prediction module; an alter odds module; a user bet database; a user prediction database; a wager prediction database; and a rules database; where the base module is configured to poll for at least one new entry in an odds database, extract the new entry and send it to the user prediction module, initiate the user prediction module, initiate the wager prediction module, and initiate the alter odds module; the user prediction module is configured to utilize at least one of machine learning, artificial intelligence, or a determination algorithm to: receive a new entry from the base module, filter a user database for at least one active user, filter the user database for a user ID, filter a set of user data for the new entry, extract the set of user data, perform correlations on extracted or received user data, determine if at least one correlation is above a predetermined threshold, extract and store extracted or received data in the user bet database, and determine if there is at least one additional active user remaining in the user database; the wager prediction module is configured to utilize at least one of machine learning, artificial intelligence, or a determination algorithm to: filter the user bet database for a first user, determine a percentage that the first user will wager for at least one possible wager outcome, select a wager outcome with a highest percentage, determine if the percentage exceeds a predetermined threshold, filter the user bet database for a wager outcome with a highest percentage, determine an average amount wagered by the first user, store prediction data in the user prediction database, and determine if there is at least one additional active user remaining in the user bet database; the alter odds module is configured to utilize at least one of machine learning, artificial intelligence, or a determination algorithm to: filter the user prediction database for a first wager outcome, determine how many users will wager on the first wager outcome and how much will be wagered on the first wager outcome, store a wager prediction in the wager prediction database, determine if there is at least one additional wager outcome, determine if there is targeted action on both sides of a wager, determine at least two percentages of action for both sides of the wager, compare percentages to the rules database, extract a corresponding rule, apply a rule to odds for a new entry in the odds database, store the new entry in the odds database, and offer at least one wager odds on a wagering application; the user bet database is configured to contain at least a wager ID, an event, a wagering market, a possible outcome for a wager, a set of odds for a wager, a user ID, a number for a wager in sequential order, a total amount wagered, an outcome wagered on, and an amount wagered for a wager; the user prediction database is configured to contain a user ID, a wager result, and an average amount wagered; the wager prediction database is configured to contain a wager outcome, at least one number of users that will wager on an outcome, and an amount wagered on an outcome; and the rules database is configured to contain a difference in percentages between possible wager outcomes and at least one rule to be applied to a set of wagering odds.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a system for Artificial Intelligence-based changes based on deviations from predictions, according to an embodiment.

FIG. 2: illustrates a base module, according to an embodiment.

FIG. 3: illustrates a user prediction module, according to an embodiment.

FIG. 4: illustrates a wager prediction module, according to an embodiment.

FIG. 5: illustrates an alter odds module, according to an embodiment.

FIG. 6: illustrates a user bet database, according to an embodiment.

FIG. 7: illustrates a user prediction database, according to an embodiment.

FIG. 8: illustrates a wager prediction database, according to an embodiment.

FIG. 9: illustrates a rules database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. The described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that specific circuits can perform the various sequence of actions described herein (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or other type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "bet" or "wager." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for certain amount or for a future time. A "bet" or "wager" can be made for being able to answer a question correctly. A "bet" or "wager" can be made within a certain period. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain to place bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game.

"Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that will be determined by a point spread or money line. The term "straight-up" means winning the game without any regard to the "point spread," a "money-line" bet. "Money line," "straight bet," and "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread." A handicap of the "point spread" value is given to the favorite team so bettors can choose sides at equal odds. "Cover the spread" means that a favorite wins an event with the handicap considered or the underdog wins with additional points. To "push" refers to when the event or game may end with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick 'em" refers to a game when neither team is favored in an event or game. "Line," "cover the spread," "cover," "tie," "pick," and "pick-em" can be integrated into the embodiments in a variety of manners.

To "middle" means to win both sides of a game; wagering on the "underdog" at one point spread and the favorite at a different point spread and winning both sides. For example, if the player bets the underdog+4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total," "over," and "under" can be integrated into the embodiments in a variety of manners.

A "parlay" is a single bet that links together two or more wagers; to win the bet, the player must win all the wagers in the "parlay." If the player loses one wager, the player loses the entire bet. However, if they win all the wagers in the "parlay," the player may receive a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay," "round robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you may use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events. Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both pitchers scheduled to start a game start. If they do not, the bet is deemed "no action" and refunded. The "run line" in baseball refers to a spread used instead of the money line. "Listed pitchers," "no action," and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle," "juice," vigorish," "vig," and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individuals that may deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management service are services that assist customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land based on property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are services that help customers with (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat players to free bets, odds boosts, enhanced access, and flexible cash-back to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by always managing commission and availability. The "cash out" or "pay out" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth by creating and delivering actionable insights on performance to help customers to manage the sports gaming. Business Applications can be integrated into the embodiments in a variety of manners.

State-based integration allows for a given sports gambling game to be modified by states in the United States or other countries, based upon the state the player is in, mobile phone, or other geolocation identification means. State-based integration can be integrated into the embodiments in a variety of manners.

Game Configurator allows for configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery and licensing method in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a database of reference fingerprints, wherein each reference fingerprint corresponds with a known recorded work. A database may contain metadata about the work and associated information, including complementary media. If the media clip's fingerprint is matched, the identification software may return the corresponding metadata to the client application. For example, during an in-play sports game, a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet"—which is a computer-generated data point—is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such item or items or meant to be limited to only the listed item or items.

It can be noted that as used herein and in the appended claims, the singular forms "a," "an," and "the" include plural references unless the context clearly dictates otherwise.

Although any systems and methods similar or equivalent to those described herein can be used in the practice or testing of embodiments, only some exemplary systems and methods are now described may endmay return.

FIG. 1 is a system for A.I.-based changes based on deviations from predictions. This system may include a live event 102, for example, a sporting event such as a football, basketball, baseball, or hockey game, tennis match, golf tournament, eSports, or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team may need to cover if the result of the game with the same as the point spread the user may not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or wireless network. The communication network, if wireless, may be implemented using communication techniques such as visible light communication (VLC), worldwide interoperability for microwave access (WiMAX), long term evolution (I.TE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, Fire Wire, Ethernet, Gigabit Ethernet, Fiber Channel, or Thunderbolt buses. In some embodiments, the mobile device 108 could be an optional component and may be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The wagering network 114 can offer several SaaS managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include but is not limited to, a plurality of betting attributes such as at least one of the following: the live event 102, a team, a player, an amount of wager, etc. The user database 116 may include, but is not limited to, information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120—that may contain the odds calculated by an odds calculation module 122—to display the odds on the user's mobile device 108 and take bets from the user through the mobile device wagering app 110.

Further, embodiments may include the odds calculation module 122, which may utilize historical play data to calculate odds for in-play wagers.

Further, embodiments may include a base module 124, which may begin with the base module 124 continuously polling for a new entry to be stored in the odds database 120. Then a new entry may be stored in the odds database 120. Next, the base module 124 may extract the new entry stored in the odds database 120. Then the base module 124 may send the wager data from the new entry stored in the odds database 120 to the user prediction module 126. Then the base module 124 may initiate the user prediction module 126. The base module 124 may initiate the wager prediction module 128. Then the base module 124 may initiate the alter odds module 130, and the process may return to continuously poll for a new entry to be stored in the odds database 120.

Further, embodiments may include a user prediction module 126, which may begin with the user prediction module 126 being initiated by the base module 124. The user prediction module 126 may receive the wager data from the new entry stored in the odds database 120 from the base module 124. Then the user prediction module 126 may filter the user database 116 on the active users. The user prediction module 126 may filter the user database 116 on the first user I.D. currently active on the wagering network 114. Then the user prediction module 126 may filter the user database 116 on the received wager data from the new entry stored in the odds database 118 from the base module 124. Then the user prediction module 126 may extract the user data stored in the user database 116 that has been filtered by the active users on the wagering network 114, the user I.D., and the received wager data from the new entry stored in the odds database 118. The user prediction module 126 may perform correlations on the extracted data. Then the user prediction module 126 may determine if the correlations are above a predetermined threshold. If the correlations are above the predetermined threshold, then the user prediction module 126 may extract the filtered user data. Then the user prediction module 126 may store the filtered user data in the user bet database 132. If the correlations are not above the predetermined threshold or after the filtered user data is stored in the user bet database 132, the user prediction module 126 may determine if there are more active users remaining on the wagering network 114. If there are more active users remaining on the wagering network, the user prediction module 126 may filter the user database 116 on the next user I.D., and the process may return to further filtering the user database 116 on the received wager data of the new entry stored in the odds database 118. If there are no more active users remaining on the wagering network 114, then the user prediction module 126 may return to the base module 124.

Further, embodiments may include a wager prediction module 128, which may begin with the wager prediction module 128 being initiated by the base module 124. Then the wager prediction module 128 may filter the user bet database 132 on the first user I.D. Then the wager prediction module 128 may determine the percentage that the user will wager on each possible wager outcome. Then the wager prediction module 128 may select the wager outcome with the highest percentage. Then the wager prediction module 128 may determine if the percentage exceeds the predetermined threshold. If the percentage exceeds the predetermined threshold, then the wager prediction module 128 may filter the user bet database 132 on the wager outcome with the highest percentage. Then the wager prediction module 128 may determine the average amount wagered by the user on the wager outcome with the highest percentage. The wager prediction module 128 may store the data in the user prediction database 134. If the percentage does not exceed the predetermined threshold or after the data is stored in the user prediction database 134, the wager prediction module 128 may determine if more users remain in the user bet database 132. If more users remain in the user bet database 132, then the wager prediction module 128 may filter the user bet database 132 on the next user I.D., and the process may return to determining the percentage that the user will wager for each of the possible wager outcomes. If no more users remain in the user bet database 132, the wager prediction module 128 may return to the base module 124.

Further, embodiments may include an alter odds module 130, which may begin with the alter odds module 130 initiated by the base module 124. The alter odds module 130 may filter the user prediction database 136 on the first wager outcome. Then the alter odds module 130 may determine how many users will wager on the wager outcome. Then the alter odds module 130 may determine how much the users will wager on the wager outcome. The alter odds module 130 may store how many users will wager and how much the users will wager in the wager prediction database 136. Then the alter odds module 130 may determine if another wager outcome is stored in the user prediction database 134. If there is another wager outcome stored in the user prediction database 134, then the alter odds module 130 may filter the user prediction database 134 on the next wager outcome, and the process may return to determine how many users will wager on the wager outcome. If no more wager outcomes remain in the user prediction database 134, then the alter odds module 130 may determine if there is even or targeted action on both sides of the wager. For example, in some embodiments, targeted action could be wagering action the is determined to be most profitable for a sportsbook, most efficient at generating user engagement, balanced action on both sides of a wager, or any other desired split of action on a wager. If there is not even or targeted action on both sides of the wager, then the alter odds module 130 may determine the percentages for action for both sides of the wager. Then the alter odds module 130 may compare the difference in the percentages to the rules database 138. Next, the alter odds module 130 may extract the corresponding rule stored in the rules database 138. Then the alter odds module 130 may apply the extracted rule to the wager odds for the new entry stored in the odds database 118. Then the alter odds module 130 may store the new odds for the wager in the odds database 118. If there is even or targeted action on both sides of the wager or after the new odds are stored in the odds database 118, then the alter odds module 130 may offer the wager odds on the wagering app 110. Then the alter odds module 130 may return to the base module 124.

Further, embodiments may include a user bet database 132, which may contain the wager I.D., the event, the wagering market, the possible outcomes for the wager, the odds for the wager, the user I.D., the number of the wager in sequential order, the total amount wagered, the outcome wagered on, and the amount wagered for the wager. For example, the user bet database 132 may store the wager data from the odds database 120 such as the wager I.D., such as 201, the event, such as the New England Patriots vs. the New York Jets, the outcomes for the wager, such as the first outcome being a pass and the second outcome being a run, and the odds for the possible outcomes, such as the odds of 2:1 for the outcome to be a pass and the odds 1:2 for the outcome to be a run. For example, the user bet database 132 may store the filtered user data from the user database 116 as described in the user prediction module 126, which may contain the user I.D., such as JS12345, the number of the wager in sequential order, such the users first wager, second wager, third wager, etc., the total amount wagered up to that point in time, such as $10 wagered total, $20 wagered total, etc., the outcome that the user wagered on, such as pass or run, and the amount that the user wagered on that individual wager, such as $10. In some embodiments, the user bet database 132 may contain the correlation coefficients calculated during the user prediction module 126. In some embodiments, the user bet database 132 may contain the predetermined threshold of the correlation coefficient to determine if the data should be stored in the database or not.

Further, embodiments may include a user prediction database 134, which may contain the user I.D., the wager result, and the average amount wagered and is created during the process described in the wager prediction module 128 and may be used in the process described in the alter odds module 130. For example, the database may contain the user I.D., such as JS12345, the wager result, such as pass, and the average amount wagered by the user, such as $10.

Further, embodiments may include a wager prediction database 136, which may be created in the process described in the alter odds module 130 and may contain the wager outcome, such as pass, the number of users that will wager on that outcome, such as three users will wager on a pass, and the amount wagered on the outcome, such as there will be $30 wagered on a pass. Finally, in some embodiments, there may be additional wager outcomes in which the process described in the alter odds module 130 may determine, for each possible wager outcome, the number of users that will wager on the wager outcome and the amount that may be wagered on the wager outcome.

Further, embodiments may include a rules database 138 that may contain the difference in percentages between the possible wager outcomes and the rule applied to the wagering odds. For example, if there are two possible wager outcomes, such as pass and run, and there is 60% of the money on the pass wagers and only 40% of the money on run wagers, there is not even or targeted action on both sides of the wager, an ideal percentage may be 50% of wagers or money on one side and 50% of wagers or money on the other side. So, the difference in percentages may be 20%, so the 2:1 odds for a pass may be above 20%, and the corresponding rule may be to decrease the odds by 20% so that the 2:1 odds for a pass may drop to 1.6:1 odds for the outcome to be a pass. Likewise, the difference may be under 20% for the run wager, and the odds for a run may be altered from 1:2 odds to 1:1.6 odds since the corresponding rule may be to increase the odds by 20%.

FIG. 2 illustrates the base module 124. The process may begin with the base module 124 continuously polling, at step 200, for a new entry to be stored in the odds database 120. For example, the base module 124 may be polling for the odds calculation module 122 to create and store the new wager data, such as the wager odds, in the odds database 118. For example, for the event such as the New England Patriots vs. the New York Jets, for the wagering market of the result of the upcoming play, the wager outcomes may be a pass or run with the odds of 2:1 for the result to be a pass and the odds of 1:2 for the result to be a run. Then a new entry may be stored, at step 202, in the odds database 120 by the base module 124. For example, for the event such as the New England Patriots vs. the New York Jets, for the wagering market of the result of the upcoming play, the wager outcomes may be a pass or run with the odds of 2:1 for the result to be a pass and the odds of 1:2 for the result to be a run. The base module 124 may extract, at step 204, the new entry stored in the odds database 120. For example, the base module 124 may extract the data such as the New England Patriots vs. the New York Jets, for the wagering market of the result of the upcoming play, the wager outcomes may be a pass or run with the odds of 2:1 for the result to be a pass and the odds of 1:2 for the result to be a run from the odds database 120. Then the base module 124 may send, at step 206, the wager data from the new entry stored in the odds database 120 to the user prediction module 126. For example, the base module 124 may send the extracted wager data from the odds database 120, such as the New England Patriots vs. the New York Jets, for the wagering market of the result of the upcoming play, the wager outcomes may be a pass or run with the odds of 2:1 for the result to be a pass and the odds of 1:2 for the result to be a run. Then the base module 124 may initiate, at step 208, the user prediction module 126. For example, the user prediction module 126 may begin with the user prediction module 126 being initiated by the base module 124. The user prediction module 126 may receive the wager data from the new entry stored in the odds database 120 from the base module 124. Then the user prediction module 126 may filter the user database 116 on the active users. The user prediction module 126 may filter the user database 116 on the first user I.D. currently active on the wagering network 114. Then the user prediction module 126 may filter the user database 116 on the received wager data from the new entry stored in the odds database 118 from the base module 124. Then the user prediction module 126 may extract the user data stored in the user database 116 that has been filtered by the active users on the wagering network 114, the user I.D., and the received wager data from the new entry stored in the odds database 118. The user prediction module 126 may perform correlations on the extracted data. Then the user prediction module 126 may determine if the correlations are above a predetermined threshold. If the correlations are above the predetermined threshold, then the user prediction module 126 may extract the filtered user data. Then the user prediction module 126 may store the filtered user data in the user bet database 132. If the correlations are not above the predetermined threshold or after the filtered user data may be stored in the user bet database 132, the user prediction module 126 may determine if there are more active users remaining on the wagering network 114. If there are more active users remaining on the wagering network, the user prediction module 126 may filter the user database 116 on the next user I.D., and the process may return to further filtering the user database 116 on the received wager data of the new entry stored in the odds database 118. If there are no more active users remaining on the wagering network 114, then the user prediction module 126 may return to the base module 124. The base module 124 may initiate, at step 210, the wager prediction module 128. For example, the wager prediction module 128 may begin with the wager prediction module 128 being initiated by the base module 124. Then the wager prediction module 128 may filter the user bet database 132 on the first user I.D. Then the wager prediction module 128 may determine the percentage that the user will wager on each possible wager outcome. Then the wager prediction module 128 may select the wager outcome with the highest percentage. Then the wager prediction module 128 may determine if the percentage exceeds the predetermined threshold. If the percentage exceeds the predetermined threshold, then the wager prediction module 128 may filter the user bet database 132 on the wager outcome with the highest percentage. Then the wager prediction module 128 may determine the average amount wagered by the user on the wager outcome with the highest percentage. The wager prediction module 128 may store the data in the user prediction database 134. If the percentage does not exceed the predetermined threshold or after the data may be stored in the user prediction database 134, the wager prediction module 128 may determine if more users are remaining in the user bet database 132. If more users are remaining in the user bet database 132, then the wager prediction module 128 may filter the user bet database 132 on the next user I.D., and the process may return to determining the percentage that the user will wager for each of the possible wager outcomes. If there are no more users remaining in the user bet database 132, the wager prediction module 128 may return to the base module 124. Then the base module 124 may initiate, at step 212, the alter odds module 130, and the process may return to continuously polling for a new entry to be stored in the odds database 120. For example, the alter odds module 130 may begin with the alter odds module 130 being initiated by the base module 124. The alter odds module 130 may filter the user prediction database 136 on the first wager outcome. Then the alter odds module 130 may determine how many users will wager on the wager outcome. Then the alter odds module 130 may determine how much the users will wager on the wager outcome. The alter odds module 130 may store how many users will wager and how much the users will wager in the wager prediction database 136. Then the alter odds module 130 may determine if another wager outcome may be stored in the user prediction database 134. If there is another wager outcome stored in the user prediction database 134, then the alter odds module 130 may filter the user prediction database 134 on the next wager outcome, and the process may return to determine how many users will wager on the wager outcome. If no more wager outcomes are remaining in the user prediction database 134, then the alter odds module 130 may determine if there is even or targeted action on both sides of the wager. If there is not even or targeted action on both sides of the wager, then the alter odds module 130 may determine the percentages for action for both sides of the wager. Then the alter odds module 130 may compare the difference in the percentages to the rules database 138. The alter odds module 130 may extract the corresponding rule stored in the rules database 138. Then the alter odds module 130 may apply the extracted rule to the wager odds for the new entry stored in the odds database 118. Then the alter odds module 130 may store the new odds for the wager in the odds database 118. If there is even or targeted action on both sides of the wager or after the new odds are stored in the odds database 118, then the alter odds module 130 may offer the wager odds on the wagering app 110. Then the alter odds module 130 may return to the base module 124.

FIG. 3 illustrates the user prediction module 126. The process may begin with the user prediction module 126 being initiated, at step 300, by the base module 124. The user prediction module 126 may receive, at step 302, the wager data from the new entry stored in the odds database 120 from the base module 124. For example, the wager data from a new entry stored in the odds database 120 may be the wager I.D., such as 201, the event, such as the New England Patriots vs. the New York Jets, the wagering market, such as the result of the play, the wager outcomes, such as the first outcome option being a pass and the second outcome option being a run, the odds for the wager outcomes, such as 2:1 odds for a pass and 1:2 odds for a run. In some embodiments, the wager data may contain the current time, the time in the event, the players participating in the play, the weather conditions at the event, etc. Then the user prediction module 126 may filter, at step 304, the user database 116 on the active users. For example, the user prediction module 126 may filter the user database 116 on all the users that are currently on, are engaged, are signed in, are actively wagering, etc., on the wagering app 110 through the wagering network 114. The user prediction module 126 may filter, at step 306, the user database 116 on the first user I.D. that is currently active on the wagering network 114. For example, the user prediction module 116 may filter the user database 116 for the first user I.D., such as JS12345, active on the wagering network 114. Then the user prediction module 126 may filter, at step 308, the user database 116 on the received wager data from the new entry stored in the odds database 118 from the base module 124. For example, the user prediction module 126 further may filter the user database 116 for the active user, such as JS12345, and the received wager data, such as the historical data in which user JS12345 has wagered on the event, such as the New England Patriots vs. the New York Jets, and has wagered on the wagering market, such as the result of the play, with the wager outcomes, such as pass and run, containing the same odds, such as 2:1 odds for a pass and 1:2 odds for a run. Then the user prediction module 126 may extract, at step 310, the user data stored in the user database 116 that has been filtered by the active users on the wagering network 114, the user I.D., and the received wager data from the new entry stored in the odds database 118. For example, the data that is extracted may be the historical data in which the active user has wagered on the event, such as the New England Patriots vs. the New York Jets, and has wagered on the wagering market, such as the result of the play, with the wager outcomes, such as pass and run, containing the same odds, such as 2:1 odds for a pass and 1:2 odds for a run. The user prediction module 126 may perform, at step 312, correlations on the extracted data. For example, the extracted data may be for the historical instances in which the active user wagered matching the received wager data, such as the event, wager market, wager outcomes, and wager odds, and then correlations are performed on the number of the wager confirmed by the user, such as the user's first wager, second wager, third wager, etc. and the total amount wagered by the user in that situation. An example of correlated parameters may be with the number of wagers vs. total amount wagered with a 0.97 correlation coefficient, and the filtered user data may be extracted and stored in the user bet database 132, for example, the number of the wager, such as first, second, third, etc., the total amount wagered, the wager outcome that the user wagered on in that instance, such as pass or run, and the wagered amount for each wager, such as $10. Then the user prediction module 126 may determine, at step 314, if the correlations are above a predetermined threshold. For example, the predetermined threshold may be set at a 0.90 correlation coefficient to determine if the user's data is highly correlated enough to predict that the user has consistently wagered on the wagering market, allowing the user prediction module 126 to determine that the user's data is relevant for predicting the upcoming action on the new wager data entry stored in odds database 120 to ensure that the wagering network 114 provides wager odds to allow for an even 50/50 split, or some other targeted split, of money from users being wagered on both sides of the wager. If the correlations are above the predetermined threshold, then the user prediction module 126 may extract, at step 316, the filtered user data. For example, if the correlation coefficient is above 0.90, such as a correlation coefficient of 0.97, then the filtered user data may be extracted. For example, the data may be the number of the wager, such as first, second, third, etc., the total amount wagered, the wager outcome that the user wagered on in that instance, such as pass or run, and the wagered amount for each wager, such as $10. Then the user prediction module 126 may store, at step 318, the filtered user data in the user bet database 132. For example, the user prediction module 126 may store the filtered user data, such as the number of the wager, such as first, second, third, etc., the total amount wagered, the wager outcome that the user wagered on in that instance, such as pass or run, and the wagered amount for each wager, such as $10. If the correlations are not above the predetermined threshold or after the filtered user data may be stored in the user bet database 132, the user prediction module 126 may determine, at step 320, if there are more active users remaining on the wagering network 114. If the correlation coefficient does not exceed the predetermined threshold, such as 0.90 correlation coefficient. In that case, the user prediction module 126 can determine that the user has not consistently wagered on the wagering market with the specific wager odds, and thus the user's data may not be relevant to predict the upcoming action for the new wager data stored in the odds database 120. If there are more active users remaining on the wagering network, the user prediction module 126 may filter, at step 322, the user database 116 on the next user I.D., and the process may return to further filtering the user database 116 on the received wager data of the new entry stored in the odds database 118. For example, the user prediction module 126 may filter the user database 116 on the next active user, such as TR98765, and the process may filter the user database 116 on the received wager data from the new entry to perform the correlations on the next user's data. If there are no more active users remaining on the wagering network 114, then the user prediction module 126 may return, at step 324, to the base module 124.

FIG. 4 illustrates the wager prediction module 128. The process may begin with the wager prediction module 128 being initiated, at step 400, by the base module 124. Then the wager prediction module 128 may filter; at step 402, the user bet database 132 on the first user I.D. For example, the wager prediction module 128 may filter the user bet database 132 on the user ID JS12345. Then the wager prediction module 128 may determine, at step 404, the percentage that the user will wager on each possible wager outcome. For example, if the wager outcomes are either pass or run the wager prediction module 128, the percentage chance that the user will wager on a pass and the percentage chance that the user will wager on a run using the user's historical data stored in the user bet database 132. For example, if the user has completed five total wagers for the specific wager market and has wagered three times on pass and two times on a run, the percentages may be 60% for a pass and 40% for a run. Then the wager prediction module 128 may select, at step 406, the wager outcome with the highest percentage. For example, if the user has a 60% chance of wagering on a pass and a 40% chance of wagering on a run, then the pass wager outcome may be selected. Then the wager prediction module 128 may determine, at step 408, if the percentage exceeds the predetermined threshold. For example, there may be a predetermined threshold, such as 55%, to determine if the user consistently wagers on a specific wager outcome, such as pass. If the percentage is below the predetermined threshold, it may be determined that the user consistently wagers on both sides of the wager outcomes and thus cannot be used for prediction purposes. If the percentage exceeds the predetermined threshold, then the wager prediction module 128 may filter, at step 410, the user bet database 132 on the wager outcome with the highest percentage. For example, if the selected wager outcome were a pass, then the user bet database 132 may be filtered on the user I.D., such as JS12345, and the wager outcome, such as pass. Then the wager prediction module 128 may determine, at step 412, the average amount wagered by the user on the wager outcome with the highest percentage. For example, the wager prediction module 128 may count the number of times the user wagered on the outcome, such as three, and the total amount wagered by the user. For example, if the user wagered $10 on every wager, their total wagered amount may be $30 and the wager prediction module 128 may divide the three times wagered by the $30 wagered total to determine the average wager amount of $10. The wager prediction module 128 may store, at step 414, the data in the user prediction database 134. For example, the wager prediction module 128 may store the user I.D., such as JS12345, the wager outcome or wager result, such as pass, and the average amount wagered, such as $10, in the user prediction database 134. If the percentage does not exceed the predetermined threshold or after the data may be stored in the user prediction database 134, the wager prediction module 128 may determine, at step 416, if more users are remaining in the user bet database 132. For example, if the percentage is below the predetermined threshold, it may be determined that the user consistently wagers on both sides of the wager outcomes and thus cannot be used for prediction purposes. If more users are remaining in the user bet database 132, then the wager prediction module 128 may filter, at step 418, the user bet database 132 on the next user I.D., and the process may return to determining the percentage that the user will wager for each of the possible wager outcomes. If there are no more users remaining in the user bet database 132, the wager prediction module 128 may return, at step 420, to the base module 124.

FIG. 5 illustrates the alter odds module 130. The process may begin with the alter odds module 130 being initiated, at step 500, by the base module 124. The alter odds module 130 may filter, at step 502, the user prediction database 134 on the first wager outcome. For example, the alter odds module 130 may filter the user prediction database 134 on the first wager outcome or wager result, such as pass. Then the alter odds module 130 may determine, at step 504, how many users will wager on the wager outcome. For example, the alter odds module 130 may count how many users are in the filtered user prediction database 134 to determine how many users will wager on the outcome of a pass. Then the alter odds module 130 may determine, at step 506, how much the users will wager on the wager outcome. For example, the alter odds module 130 may count the average wager amount for each user to determine the total amount that will be wagered on the wager outcome being a pass. 506. The alter odds module 130 may store, at step 508, how many users will wager and how much the users will wager in the wager prediction database 136. For example, the alter odds module may store the number of users, such as 3, the amount that will be wagered by those users, such as $30, in the wager prediction database 136. Then the alter odds module 130 may determine, at step 510, if another wager outcome may be stored in the user prediction database 134. For example, if there is another wager outcome, such as run, then the alter odds module 130 will filter the user prediction database 134 on the wager outcome being a run. If there is another wager outcome stored in the user prediction database 134, then the alter odds module 130 may filter, at step 512, the user prediction database 134 on the next wager outcome, and the process may return to determine how many users will wager on the wager outcome. If no more wager outcomes remain in the user prediction database 134, then the alter odds module 130 may determine, at step 514, if there is even or targeted action on both sides of the wager. For example, if there is a prediction that there will be $30 on the wager outcome being a pass and $20 on the wager outcome being a run, there would not be even or targeted action on the wager. Ideally, wagering platforms and wagering applications desire to get even or targeted amounts of money on both sides of a wager, known as getting even or targeted action on a wager. If there is not even or targeted action on both sides of the wager, then the alter odds module 130 may determine, at step 516, the percentages for action for both sides of the wager. For example, if there is a prediction that there will be $30 on the wager outcome being a pass and $20 on the wager outcome being a run, then that may be 60% of the money on a pass and only 40% of the money being wagered on a run, which for the pass outcome may be above 20% and for the run outcome that may be below 20%. Then the alter odds module 130 may compare, at step 518, the difference in the percentages to the rules database 138. For example, the alter odds module 130 may compare the above 20% for the outcome being a pass and below 20% for the outcome being a run to the rules database 138. For example, if there are two possible wager outcomes, such as pass and run, and there is 60% of the money on the pass wagers and only 40% of the money on run wagers, there is not even or targeted action on both sides of the wager, an ideal percentage may be 50% of wagers or money on one side and 50% of wagers or money on the other side. So, the difference in percentages may be 20%, so the 2:1 odds for a pass may be above 20%, and the corresponding rule may be to decrease the odds by 20% so that the 2:1 odds for a pass may drop to 1.6:1 odds for the outcome to be a pass. The difference may be under 20% for the run wager, and the odds for a run may be altered from 1:2 odds to 1:1.6 odds since the corresponding rule may be to increase the odds by 20%. The alter odds module 130 may extract, at step 520, the corresponding rule stored in the rules database 138. For example, the extracted rule may be that the wager odds for the wager outcome being a pass should have the odds decreased by 20%, and the wager odds for the wager outcome being a run may be to increase the odds by 20%. Then the alter odds module 130 may apply, at step 522, the extracted rule to the wager odds for the new entry stored in the odds database 118. For example, the original 2:1 odds for a pass may decrease by 20% to 1.6:1 odds for the outcome to be a pass, and the original 1:2 odds for a run may increase by 20% to 1:1.6 odds for the outcome to be run. Then the alter odds module 130 may store, at step 524, the new odds for the wager in the odds database 118. For example, the alter odds module 130 may store the wager odds of the 1.6:1 for a pass and 1:1.6 for a run in the odds database 120, updating the wager data stored for the new entry. If there is even or targeted action on both sides of the wager or after the new odds are stored in the odds database 118, then the alter odds module 130 may offer, at step 526, the wager odds on the wagering app 110. Then the alter odds module 130 may return, at step 528, to the base module 124.

FIG. 6 illustrates the user bet database 132. The database may contain the wager I.D., the event, the wagering market, the possible outcomes for the wager, the odds for the wager, the user I.D., the number of the wager in sequential order, the total amount wagered, the outcome wagered on, and the amount wagered for the wager. For example, the user bet database 132 may store the wager data from the odds database 120 such as the wager I.D., such as 201, the event, such as the New England Patriots vs, the New York Jets, the outcomes for the wager, such as the first outcome being a pass and the second outcome being a run, and the odds for the possible outcomes, such as the odds of 2:1 for the outcome to be a pass and the odds 1:2 for the outcome to be a run. For example, the user bet database 132 may store the filtered user data from the user database 116 as described in the user prediction module 126, which may contain the user I.D., such as JS12345, the number of the wager in sequential order, such the users first wager, second wager, third wager, etc., the total amount wagered up to that point in time, such as $10 wagered total, $20 wagered total, etc., the outcome that the user wagered on, such as pass or run, and the amount that the user wagered on that individual wager, such as $10. In some embodiments, the user bet database 132 may contain the correlation coefficients calculated during the user prediction module 126. In some embodiments, the user bet database 132 may contain the predetermined threshold of the correlation coefficient to determine if the data should be stored in the database or not.

FIG. 7 illustrates the user prediction database 134. The database may contain the user I.D., the wager result, and the average amount wagered and is created during the process described in the wager prediction module 128 and is used in the process described in the alter odds module 130. For example, the database may contain the user I.D., such as JS12345, the wager result, such as pass, and the average amount wagered by the user, such as $10.

FIG. 8 illustrates the wager prediction database 136. The database may be created in the process described in the alter odds module 130 and may contain the wager outcome, such as pass, the number of users that will wager on that outcome, such as three users will wager on a pass, and the amount wagered on the outcome, such as there will be $30) wagered on a pass. In addition, in some embodiments, there may be additional wager outcomes in which the process described in the alter odds module 130 will determine, for each possible wager outcome, the number of users that will wager on the wager outcome and the amount that will be wagered on the wager outcome.

FIG. 9 illustrates the rules database 138. The database may contain the difference in percentages between the possible wager outcomes and the rule which should be applied to the wagering odds. For example, if there are two possible wager outcomes, such as pass and run, and there is 60% of the money on the pass wagers and only 40% of the money on run wagers, there is not even or targeted action on both sides of the wager, an ideal percentage may be 50% of wagers or money on one side and 50% of wagers or money on the other side. So, the difference in percentages may be 20%, so the 2:1 odds for a pass may be above 20%, and the corresponding rule may be to decrease the odds by 20% so that the 2:1 odds for a pass may drop to 1.6:1 odds for the outcome to be a pass. The difference may be under 20% for the run wager, and the odds for a run may be altered from 1:2 odds to 1:1.6 odds since the corresponding rule may be to increase the odds by 20%.

The foregoing description and accompanying figures illustrate the principles, preferred embodiments, and modes of operation of the invention. However, the invention should not be construed as being limited to the embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for artificial intelligence-based changes driven by deviations from predictions on a sport wagering network, comprising:

receiving wager data from an odds database;

extracting user data from a user database;

determining at least one correlation between received wager data and extracted user data by at least one of machine learning or artificial intelligence;

determining if the correlation is above a predetermined correlation threshold;

determining at least one user wager possibility percentage for at least one possible wager outcome by at least one of machine learning or artificial intelligence;

selecting the possible wager outcome with a highest user wager possibility percentage by at least one of machine learning or artificial intelligence;

determining if the wager possibility percentage exceeds a predetermined percentage threshold by at least one of machine learning or artificial intelligence;

determining at least one average amount wagered and storing the average amount wagered in a user prediction database;

determining at least one user who will wager on an outcome and at least an amount to be wagered on the outcome by at least one of machine learning or artificial intelligence;

determining if targeted action exists for both sides of a wager and determining an adjustment percentage if the targeted action does not exist by at least one of machine learning or artificial intelligence; and offering at least wager odds on a wagering application.

2. The method for artificial intelligence-based changes driven by deviations from predictions on a sport wagering network of claim 1, wherein the predetermined correlation threshold amount comprises a correlation coefficient amount set by an administrator.

3. The method for artificial intelligence-based changes driven by deviations from predictions on a sport wagering network of claim 1, wherein the predetermined percentage threshold comprises a percentage amount set by an administrator.

4. The method for artificial intelligence-based changes driven by deviations from predictions on a sport wagering network of claim 1, wherein the targeted action comprises an equal percentage of wagers.

5. The method for artificial intelligence-based changes driven by deviations from predictions on a sport wagering network of claim 1, wherein determining the adjustment percentage further comprises executing at least one rule from a rules database to adjust the adjustment percentage amount by a set amount.

* * * * *